United States Patent
Miller et al.

(10) Patent No.: US 7,974,907 B2
(45) Date of Patent: Jul. 5, 2011

(54) CONFIGURABLE SECURITY PROCESSOR IDENTIFIER TABLE

(75) Inventors: Robert Miller, Milford, CT (US); Timothy Vincent, Shelton, CT (US)

(73) Assignee: The NASDAQ OMX Group, Inc., Rockville, MD (US)

( * ) Notice: Subject to any disclaimer, the term of this patent is extended or adjusted under 35 U.S.C. 154(b) by 2204 days.

(21) Appl. No.: 10/206,149

(22) Filed: Jul. 25, 2002

(65) Prior Publication Data

US 2003/0225671 A1 Dec. 4, 2003

Related U.S. Application Data

(60) Provisional application No. 60/385,979, filed on Jun. 5, 2002, provisional application No. 60/385,988, filed on Jun. 5, 2002.

(51) Int. Cl.
*G06Q 40/00* (2006.01)
(52) U.S. Cl. ............... 705/37; 705/36; 705/39; 705/35; 705/44
(58) Field of Classification Search .................. 705/37, 705/90
See application file for complete search history.

(56) References Cited

U.S. PATENT DOCUMENTS

| | | | |
|---|---|---|---|
| 5,101,353 A | 3/1992 | Lupien et al. | |
| 6,035,287 A * | 3/2000 | Stallaert et al. | 705/37 |
| 6,157,914 A | 12/2000 | Seto et al. | |
| 6,278,982 B1 * | 8/2001 | Korhammer et al. | 705/36 R |
| 6,317,728 B1 * | 11/2001 | Kane | 705/36 R |
| 6,442,533 B1 * | 8/2002 | Hinkle | 705/36 R |
| 6,820,069 B1 * | 11/2004 | Kogan et al. | 706/46 |
| 7,082,133 B1 * | 7/2006 | Lor et al. | 370/392 |
| 7,184,441 B1 * | 2/2007 | Kadambi et al. | 370/400 |
| 7,496,533 B1 * | 2/2009 | Keith | 705/37 |
| 2002/0156716 A1 * | 10/2002 | Adatia | 705/37 |
| 2003/0140027 A1 * | 7/2003 | Huttel et al. | 707/1 |

OTHER PUBLICATIONS

Non-Patent Literature, Author: Pete Olympia, DBMS, v8, n2, p. 30(4), dated Feb. 1995, ISSN: 1041-5173.*

* cited by examiner

*Primary Examiner* — Ella Colbert
*Assistant Examiner* — Hai Tran
(74) *Attorney, Agent, or Firm* — Fish & Richardson P.C.

(57) ABSTRACT

A system in an electronic securities market includes a configurable look-up table having assignment entries that assign each of a plurality of securities to one or more securities processors in the system. A configuration process allows administration of the assignment entries included in this configurable look-up table.

18 Claims, 6 Drawing Sheets

CONFIGURABLE SECURITY PROCESSOR IDENTIFIER TABLE

RELATED APPLICATIONS

This application claims the priority of: U.S. Provisional Patent Application No. 60/385,979, entitled "Supermontage Architecture", and filed on Jun. 5, 2002; and U.S. Provisional Patent Application No. 60/385,988, entitled "Security Processor", and filed on Jun. 5, 2002.

BACKGROUND

This invention relates to electronic-based securities trading, and more particularly to processing and displaying of information relating to electronic securities trading.

Electronic equity markets, such as The Nasdaq Stock Market™ collect, aggregate, and display pre-trade information to market participants. In the Nasdaq Stock Market, for example, this pre-trade information takes the form of a quote that represents a single or an aggregate of same-priced principal or agency orders. A market, such as The Nasdaq Stock Market™, also provides trading platforms through which market participants may trade securities in the marketplace.

SUMMARY

According to an aspect of this invention, a system in an electronic securities market includes a configurable look-up table that has assignment entries that assign each of a plurality of securities to one or more securities processors in the system. A configuration process allows administration of the assignment entries included in this configurable look-up table.

One or more of the following features may also be included. The configurable look-up table is a text-based file and the configuration process is a text-based file editor. The configurable look-up table is a database file and the configuration process is a database configuration utility.

A security look-up process accesses the configurable look-up table in response to a received order involving a specific security to determine which securities processor the specific security is assigned to. A messaging process, responsive to the security look-up process, sends the received security order to the securities processor to which the specific security is assigned.

The configurable look-up table includes a specific entry table and a rule entry table, such that specific entry and rule entry tables each include one or more assignment entries that assign each of a plurality of securities to one or more securities processors.

The specific entry table includes one or more security-specific entries that assign a single security to a specific securities processor, such that the specific securities processor processes received orders concerning the single security and other securities assigned to the specific securities processor. The specific entry table includes one or more dedicated entries that assign a single security to a dedicated securities processor, such that the dedicated securities processor only processes received orders concerning the single security.

The rule entry table includes one or more id-range entries that assign a range of securities to a specific securities processor. The rule entry table includes one or more floating entries that assign a single security to the next-available securities processor.

The configurable look-up table is configured so that the specific entry table is first accessed to determine if it includes an assignment entry for the specific security associated with the received order, such that the rule entry table is subsequently accessed if the appropriate assignment entry is not included in the specific entry table.

According to a further aspect of this invention, a configurable look-up table for use in an electronic securities market includes a specific entry table and a rule entry table. The specific entry and rule entry tables each include one or more assignment entries that assign each of a plurality of securities to one or more securities processors.

One or more of the following features may also be included. The specific entry table includes one or more security-specific entries that assign a single security to a specific securities processor, such that the specific securities processor processes received orders concerning the single security and other securities assigned to the specific securities processor. The specific entry table includes one or more dedicated entries that assign a single security to a dedicated securities processor, such that the dedicated securities processor only processes received orders concerning the single security.

The rule entry table includes one or more id-range entries that assign a range of securities to a specific securities processor. The rule entry table includes one or more floating entries that assign a single security to the next-available securities processor.

The configurable look-up table is configured so that the specific entry table is first accessed to determine if it includes an assignment entry for the specific security associated with the received order, such that the rule entry table is subsequently accessed if the appropriate assignment entry is not included in the specific entry table.

According to a further aspect of this invention, a data structure for use with a security routing process includes a first table descriptor field having at least one security identification field that contains a specific security identifier, and at least one destination identification field that contains a destination identifier that is associated with the specific security identifier. A second table descriptor field includes at least one security identification field that contains a rule security identifier, and at least one destination identification field that contains a destination identifier that is associated with the rule security identifier.

One or more of the following features may be included. The specific security identifier is a security-specific entry that identifies a single security for assignment to a specific securities processor. This specific securities processor processes received orders concerning the single security and other securities assigned to the specific securities processor.

The specific security identifier is a dedicated entry that identifies a single security for assignment to a dedicated securities processor. This dedicated securities processor only processes received orders concerning the single security.

The rule security identifier is an id-range entry that identifies a range of securities for assignment to a specific securities processor.

The rule security identifier is a floating entry that identifies a single security for assignment to the next-available securities processor.

One or more advantages can be provided from the above. By using a routing table to split the processing of trades amongst numerous securities processors, system throughput can be increased. In addition, by making this routing table easily reconfigurable, the assignment of securities to specific securities processors can be varied in response to changes in system use. Further, as the routing table allows additional securities processors to be added and tested prior to being put into actual use, system testing is simplified and system stability is enhanced. Additionally, the use of modular securities processors and a configurable routing table allows for a system that can grow and expand in accordance with its needs.

DETAILED DESCRIPTION

Figure 1:
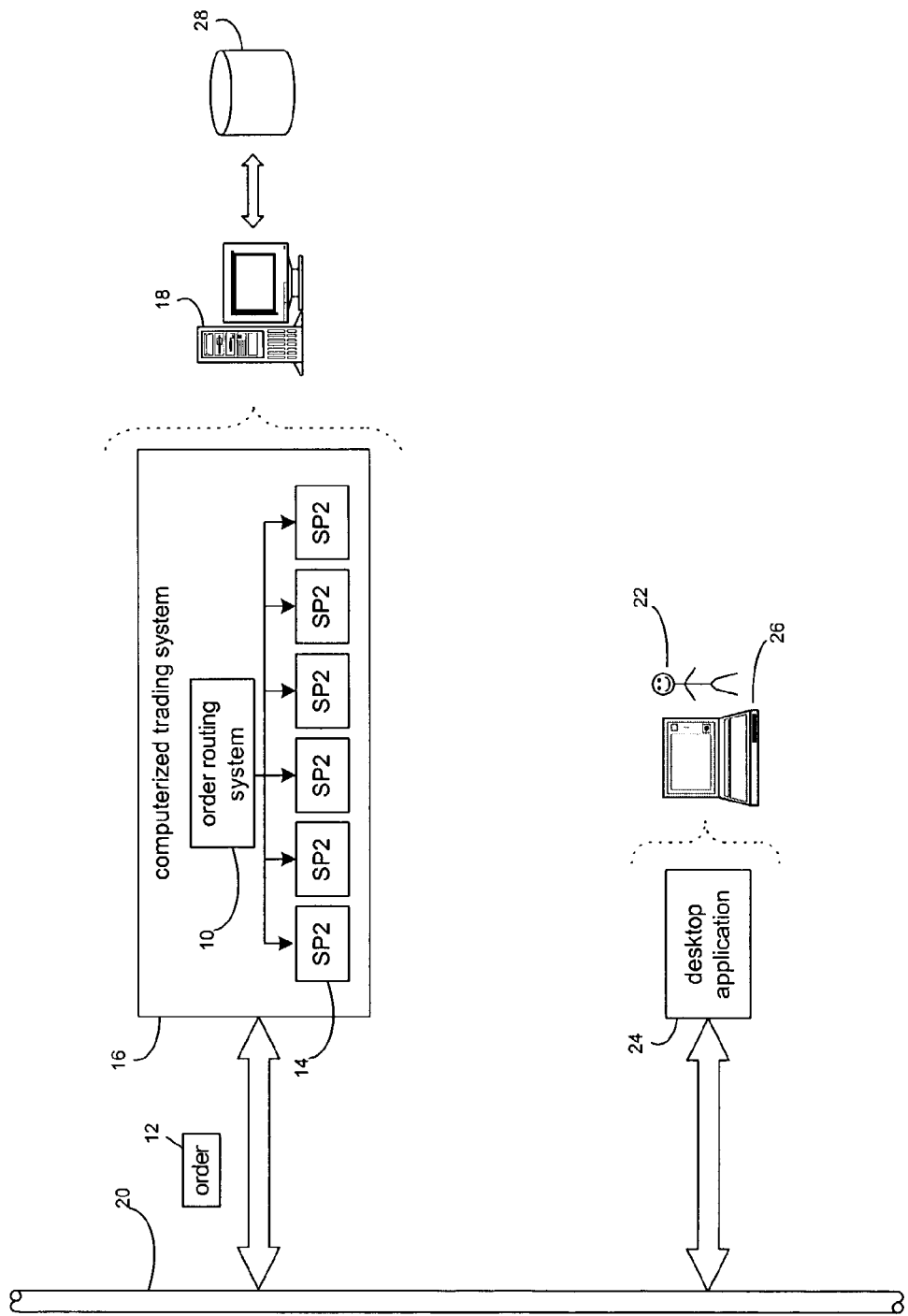
FIG. 1 is a block diagram of a computerized trading system including an order routing system and a securities processor.

Referring to FIG. 1, there is shown an order routing system 10 that directs received orders 12 for the buying and selling of securities to a securities processor (e.g., securities processor 14) that is assigned to a specific security. Order routing system 10 is incorporated into and part of a computerized trading system 16 that trades securities, including the specific security that is the subject of received order 12. The securities processor processes the security order and effectuates the trading of the security. By assigning certain securities to certain securities processors, a single securities processor is not required to process all of the orders handled by the computerized trading system 16. Accordingly, the load balancing of the individual securities processors within the system can be controlled and the efficiency and throughput of the system is enhanced.

Order routing system 10 resides on a server 18 that is connected to network 20 (e.g., the Internet, an intranet, a local area network, some other form of network, etc.). Computerized trading system 16, which trades securities electronically, processes trades (e.g., order 12) entered by various market participants (e.g., market participant 22). Market participant 22 typically accesses and uses computerized trading system 16 via a desktop application 24 (e.g., Microsoft Internet Explorer™, Netscape Navigator™, the Nasdaq Workstation II™, a specialized desktop interface, etc.) running on computer 26, thus allowing market participant 22 to trade securities with other market participants (not shown).

The instruction sets and subroutines of order routing system 10 and securities processor 14 are typically stored on a storage device 28 connected to server 18. Additionally, computerized trading system 16 stores all information relating to securities trades on storage device 28. Storage device 28 can be a hard disk drive, a tape drive, an optical drive, a RAID array, a random access memory (RAM), or a read-only memory (ROM), for example.

Server 18 includes at least one central processing unit (not shown) and main memory system (not shown). Typically, server 18 is a multi-processing, fault-tolerant system that includes multiple central processing units that each have a dedicated main memory system or share a common main memory pool. While being executed by the central processing unit(s) of server 18, order routing system 10 and multiple instantiations of securities processor 14 reside in the main memory system of server 18. Further, the processes and subroutines of order routing system 10 and securities processor 14 may also be present in various levels of cache memory incorporated into server 18.

Figure 2:
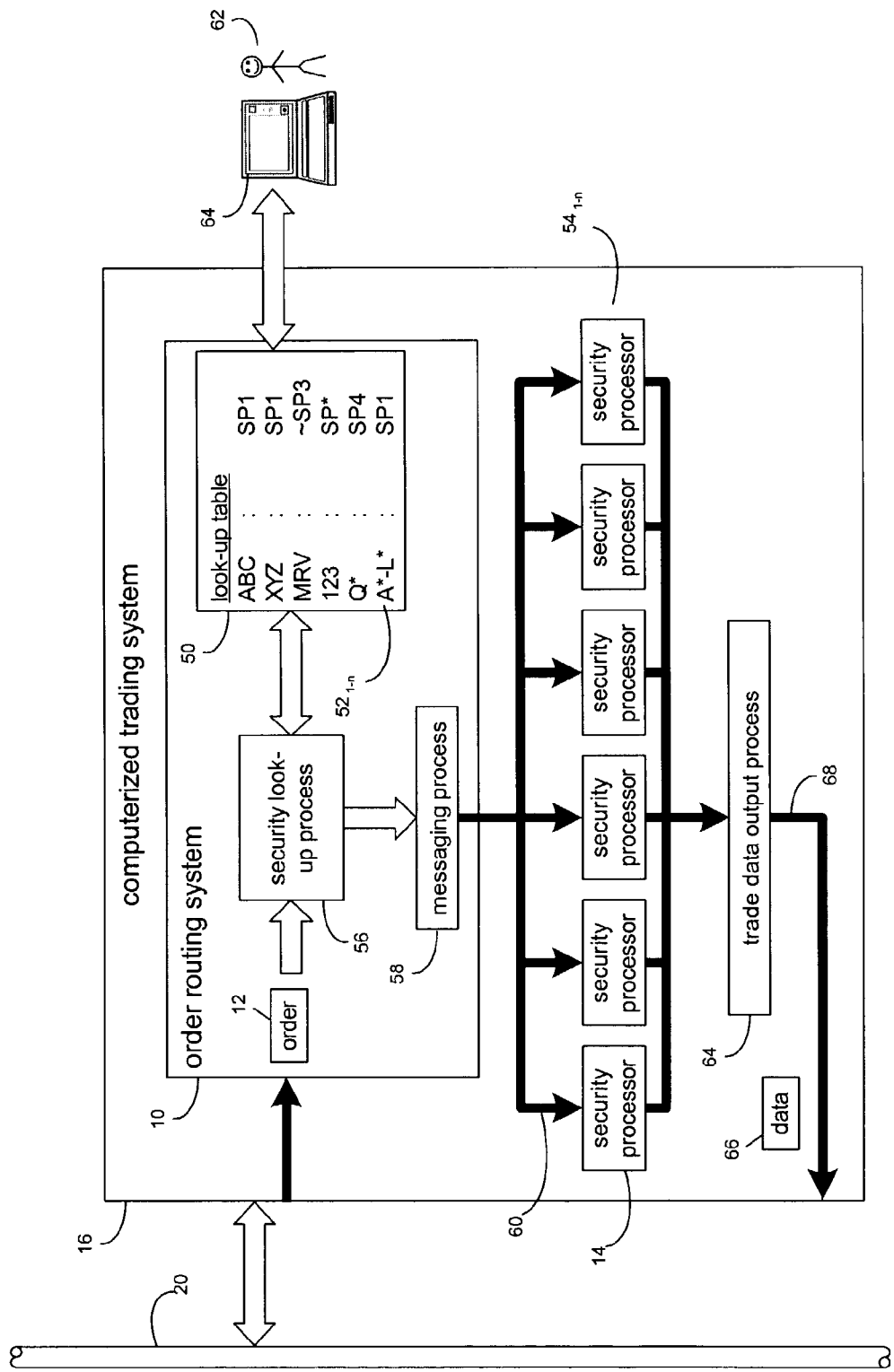
FIG. 2 is a block diagram of the order routing system.

Referring to FIG. 2, order routing system 10 includes a configurable look-up table 50 that includes assignment entries $52_{1-n}$ that assign each of the securities traded on computerized trading system 16 to one or more securities processors $54_{1-n}$. Look-up table 50 can be configured in various forms. For example, table 50 can be in the form of a multi-column, multi-row text-based ASCII (i.e, American Standard Code for Information Interchange) file that is accessed to determine the assigned securities processor. Alternatively, look-up table 50 may be a database from which a query is made concerning the security and the appropriate database record is retrieved, such that this database record specifies the securities processor to which that specific security is assigned. Other file arrangements/structures are also possible, such as a comma delimited text file.

During the course of the trading day and, possibly, before and after the trading day, market participants (e.g., market participant 22) places orders (e.g., order 12) for securities traded on computerized trading system 16. These orders, which are typically in the form of messages, include several pieces of information, such as: the name of the market participant who placed the order; a symbol (or some other identifier) for the security being sought for purchase or offered for sale; and a quantity indicator concerning the number of shares sought for purchase or offered for sale, for example.

When a market participant 22 places an order 12, the order is transmitted to computerized trading system 16 via network 20. Upon receipt of order 12, a security look-up process 56 parses order 12 to determine the security to which the order relates. Typically, security-look-up process 56 will examine order 12 to find a ticker symbol (or some other identifier) for the security to which the order pertains. Assume that, for this example, order 12 pertains to one-hundred shares of XYZ Corp. that Market Participant A wishes to purchase for $17.00 per share. Security look-up process 56 parses this order and extracts the ticker symbol XYZ that is included in the message body Alternatively, some other form of identifier can be used (e.g., a binary identifier) provided that assignment entries $52_{1-n}$ use these identifiers to assign the securities processors.

Security look-up process 56 accesses configurable look-up table 50 to determine the securities processor to which ticker symbol XYZ is assigned. As is shown configurable look-up table 50, security XYZ is assigned to securities processor SP1. Depending on the structure of table 50 (e.g., ASCII table, database, text file, etc), security look up process 56 may scan table 50 (if it is an ASCII table or text file), or may launch a query (if it is a database) to determine which securities processor the security is assigned to. As order 12 is typically in the form of a message, once the determination is made, messaging process 58 populates the header of the message to include an identifier for that securities processor. Alternatively, order 12 may be appended to include a header that identifies the assigned securities processor. Once this process is complete, order 12 is broadcast over bus 60 to the assigned securities processor (securities processor 14, for example).

Figure 3:
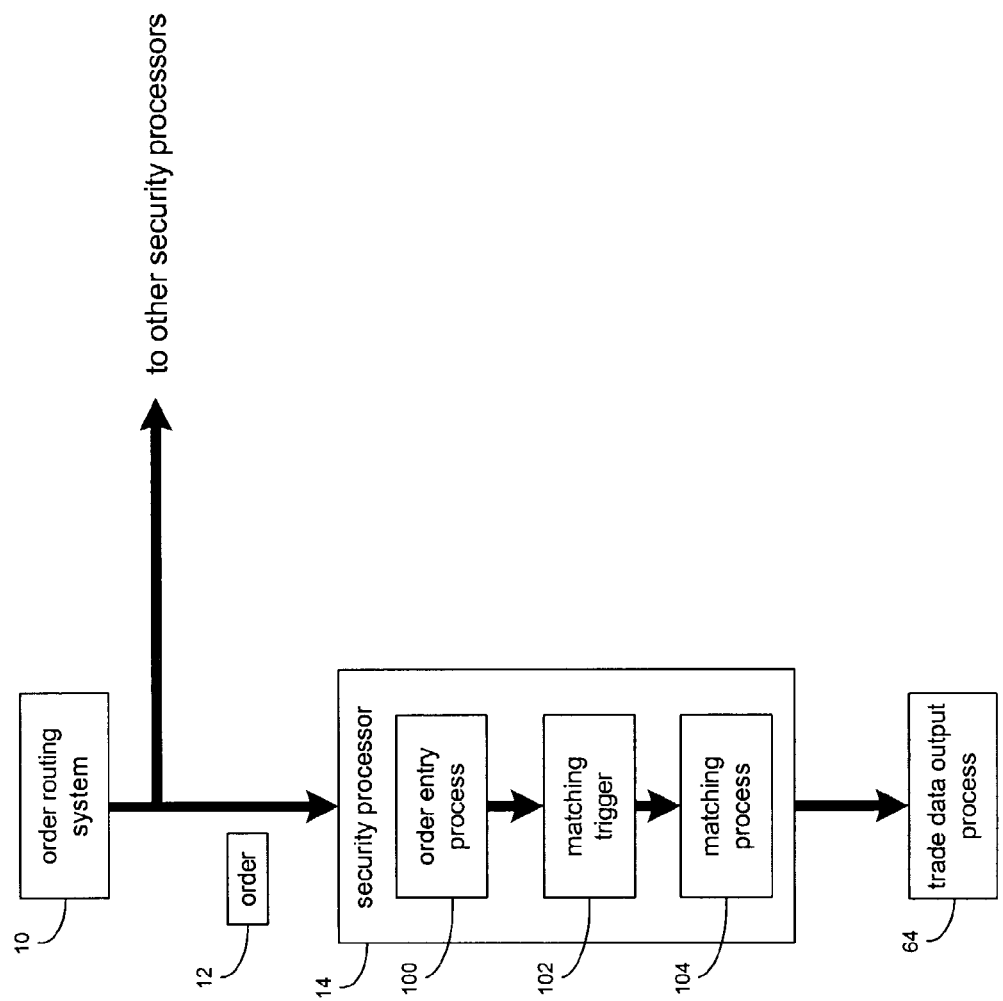
FIG. 3 is a block diagram of the securities processor.

Referring to FIG. 3, once order 12 is received by the securities processor 14, a check is performed by order entry process 100 to make sure that the order passes certain preliminary checks (e.g., order eligibility, order syntax, etc.). The specifics of the checks being performed and the action taken in response to a failure is configured by administrator 62 using computer 64. Typically, if an order fails any of these checks, the order is rejected and the market participant who placed the order is notified.

If the order is validated by order entry process 100, order 12 is passed to matching trigger 102. Matching trigger 102 functions as a queue for those orders that are received by the securities processor but have not been processed yet. In addition, matching trigger 102 stores other pending orders, quotes, deliveries, and supervisory commands for the securities assigned to the securities processor.

Once queued by matching trigger 102, these orders/commands wait in line to be processed by matching process 104. When available, matching process 104 retrieves the next-in-line order/command (order 12, for example) so that it could be processed. As stated above, order 12 pertains to one-hundred shares of XYZ Corp. that Market Participant A wishes to purchase for $17.00 per share. This order, which represents a bid-to-buy (hereinafter a "bid") XYZ Corp. is entered into the order book (not shown) for securities processor 12 for subsequent matching with a corresponding offer-to-sell (hereinafter an "offer") XYZ Corp.

During the course of the day, the trade value of the security (XYZ Corp., for example) will vary as market conditions fluctuate. Whenever a market participant is offering a security for sale at the same price that another market participant is willing to pay for the security, matching process 104 executes a trade between those two market participants. However, if the highest bid is lower than the lowest offer, the security will not be traded and these pending bids-to-buy and offers-to-sell will remain on that security's order book. This price differential between the lowest offer and the highest bid is commonly referred to as the "spread".

Whenever an order is executed in the form of a trade, an order fails to match with another outstanding offer within a predetermined period of time (e.g., immediately, during the trading day, etc.), or an order is rejected by order entry process 100, a trade data output process 64 transmits trade data 66 to the market participant who placed the order. This trade data will vary depending on the action taken by securities processor 14. For example, if the order was rejected, the market participant will typically receive a message specifying that the order was rejected and the reasons for the rejection (e.g., negative volume, negative share price, etc.). If the order was executed, the market participant may receive a message specifying that the order was executed and defining the number of shares sold and the per-share price. Further, if the order failed to execute, the message received by the market participant would typically specify the reason for the failure (e.g., order did not execute immediately, order did not execute by the close of trading, etc.). These notification messages are broadcast across output bus 68 which is connected to network 14.

Administrator 62 (via computer 64 and a configuration utility running on it) can configure and reconfigure configurable look-up table 50 to vary the individual loading of the securities processors $54_{1-n}$ or the overall load of the computerized trading system 16. The manner in which table 50 is modified varies depending on the configuration of the table. If the table is an ASCII-based table or text file, a simple text or ASCII line editor may be used to assign and reassign securities to various securities processors. Alternatively, if table 50 is configured as a database, database editing/configuration software ( such as that offered by Sybase®, Microsoft®, and Oracles®) may be used to add, delete, or modify records within the database.

As explained above, the actual trading of the orders placed by the market participants is handled by the securities processors incorporated into computerized trading system 16. The greater the number of securities processors employed, the greater the throughput of computerized trading system 16. Specifically, as the number of securities processors is increased, the number of trades that system 16 is capable of handling is also increased.

As would be expected, bigger well-know securities tend to be traded at higher volumes than smaller less-known securities. Accordingly, administrator 62 may assign one or more of their highest volume securities to a single securities processor, such that another securities processor handles all the remaining securities. Additionally, as the look-up table is reconfigurable, these definitions can be reassigned as trading trends vary. For example, assume that XYZ Corp. is the highest traded stock handled by computerized trading system 16 and, therefore, administrator 62 only assigned XYZ Corp. to the first of the six securities processors, such that the second through the sixth securities processors handle the trades of all other securities traded on the system 16. If, over time, XYZ Corp. starts to trade less frequently and ABC Corp. (another security traded on computerized trading system 16) becomes the highest traded security, administrator 16 could easily reassign XYZ Corp. so that it is processed by any of securities processors two through six, thus freeing up the first securities processor to exclusively process trades of ABC Corp.

Since additional securities processors can be added to system 10 to accommodate higher trade volumes, computerized trading system 10 is scalable. For example, if administrator 62 decided that the load level of all six securities processors were too high and, therefore, reassigning securities from one securities processor to another would not free up any bandwidth, a seventh securities processor can be added to system 16. This new securities processor would be given a unique address or identifier and look-up table 50 would be modified so that one or more securities are assigned to this newly added securities processor. Additionally, as these securities processor are each autonomous processors that run separately and independently of each other, the new securities processor may be added and tested without jeopardizing the stability of computerized trading system 16. For example, a seventh securities processor may be added and, prior to the system executing trades of actual securities, this new securities processor can be tested. A batch test-procedure can be used to trade "test" securities to verify the securities processor's reliability prior to actually using the new securities processor in the system. Once the reliability of the new securities processor is established, look-up table 50 can be modified to assign actual securities to that newly-added securities processor.

Concerning the types of assignment entries $52_{1-n}$ that are included in look-up table 50, these entries may be security-specific assignment entries; dedicated assignment entries; id-range assignment entries; or floating assignment entries, for example. Each of these will be discussed below in greater detail.

A security-specific assignment entry is an assignment entry that assigns a specific security (or security symbol) to a specific security processor. An example of a security-specific assignment entry is "XYZ:SP1", in that it assigns security XYZ Corp. to securities processor SP1. However, securities processor SP1 is available to also process trades concerning other securities.

A dedicated assignment entry is an assignment entry that assigns a security to a dedicated securities processor, such that this dedicated securities processor only processes trades concerning that one security. If look-up table 50 does not use wildcards (to be discussed below), every assignment would function as a dedicated assignment until a second security was assigned to the same security processor. An example of this type of dedicated assignment would be "MRV:SP3", since no other security is assigned to securities processor SP3. However, if assignment entries are made that use wildcards (to be discussed below), the dedicated assignment entry would have to indicate that the securities processor is exclusively assigned. An example of this type of dedicated assignment is "MRV:~SP3", such that the "~" prefix before the SP3 would be indicative of the exclusivity and, therefore, prevent wildcard assignments from assigning any other securities to securities processor SP3.

An id-range assignment entry is an assignment entry that assigns a range of securities to a specific securities processor. For example, securities beginning with the letters A-L may be assigned to securities processor SPI. The corresponding id-range assignments is "A*-L*:SP1". Note the use of the wildcard symbol "*" to identify any combination beginning with a certain character. Further, these id-range assignments may specify a range of securities beginning with certain numbers, such as "1*-9*:SP3".

A floating assignment entries is an entry that assigns a specific security to any one of a range of securities processors. For example, security 123 may be assigned to the next-available securities processor. Typically, this type of assignment is performed on lower-priority, lightly-traded securities. An example of this type of floating assignment is "123:SP*", such that the wildcard character is used to represent the securities processor assignment. Note that if such wildcard securities processor assignments are used, any dedicated assignment would have to indicate exclusivity for a securities processor to avoid a floating assignment assigning a security to a dedicated securities processor.

Figure 4:
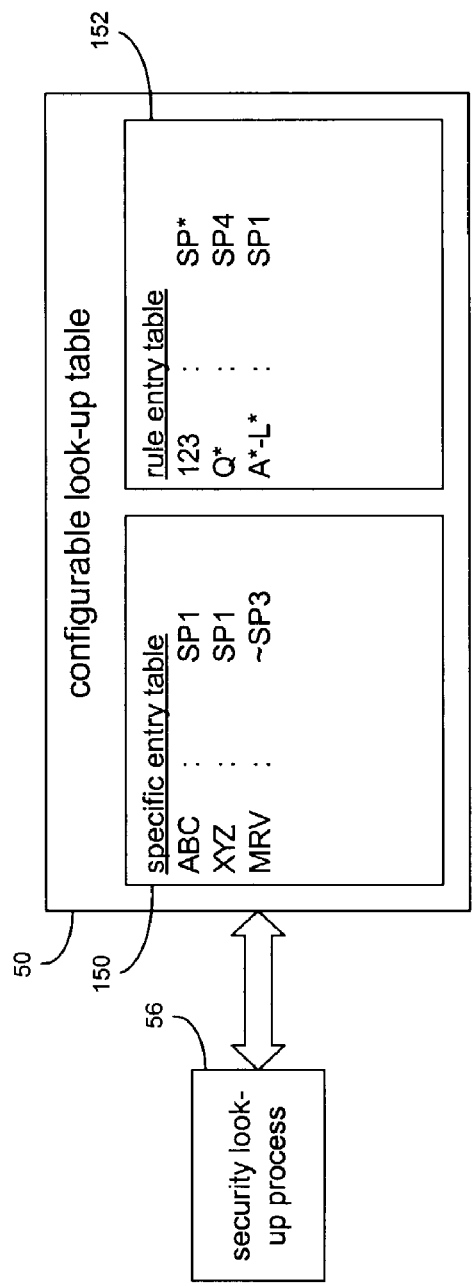
FIG. 4 is a block diagram of a configurable look-up table.

Referring to FIG. 4, look-up table 50 may be configured to include a specific-entry table 150 and a rule-entry table 152. Specific entry table 150 includes security-specific assignment entries (e.g., XYZ:SP1) and dedicated assignment entries (e.g., MRV:~SP3). Rule entry table 154 includes id-range assignment entries (e.g., A*-L*:SP1) and floating assignment entries (e.g., 123:SP*).

If look-up table 50 is configured to include a specific entry table 150 and a rule entry table 152, security look-up process 56 is configured to first access and search the specific entry table 150 to determine if it includes an assignment entry for the security associated with a received order. If table 150 includes such an entry, security look-up process 56 will stop searching table 50. However, if table 150 does not include such an entry, security look-up process 56 will access and search rule-entry table 152 to determine if it includes an assignment entry for the security associated with the received order.

Look-up table 50 is a multi-field data structure that includes a first table descriptor field (i.e., specific entry table 150) and a second table descriptor field (i.e., rule entry table 152).

The first table descriptor field includes at least one security identification field 154 that contains a specific security identifier, and at least one destination identification field 156 that contains a destination identifier that is associated with the specific security identifier. Examples of these associated entries are security-specific entries (e.g., XYZ:SP1) and dedicated entries (e.g., MRV:~SP3).

The second table descriptor field includes at least one security identification field 158 that contains a rule security identifier, and at least one destination identification field 160 that contains a destination identifier that is associated with the rule security identifier. Examples of these associated entries are id-range assignment entries (e.g., A*-L*:SP1) and floating assignment entries (e.g., 123:SP*)

While FIGS. 1 and 2 are shown to include six securities processors, the actual number of securities processors varies depending on, among other things, system loading and trade volume.

While specific examples were given concerning security-specific assignment entries, dedicated assignment entries, id-range assignment entries, and floating assignment entries, the structure and nomenclature of these entries is for illustrative purposes only. Specifically, administrator 62 and/or the designer of system 16 may choose a nomenclature or syntax that is different than the above-stated examples.

Figure 5:
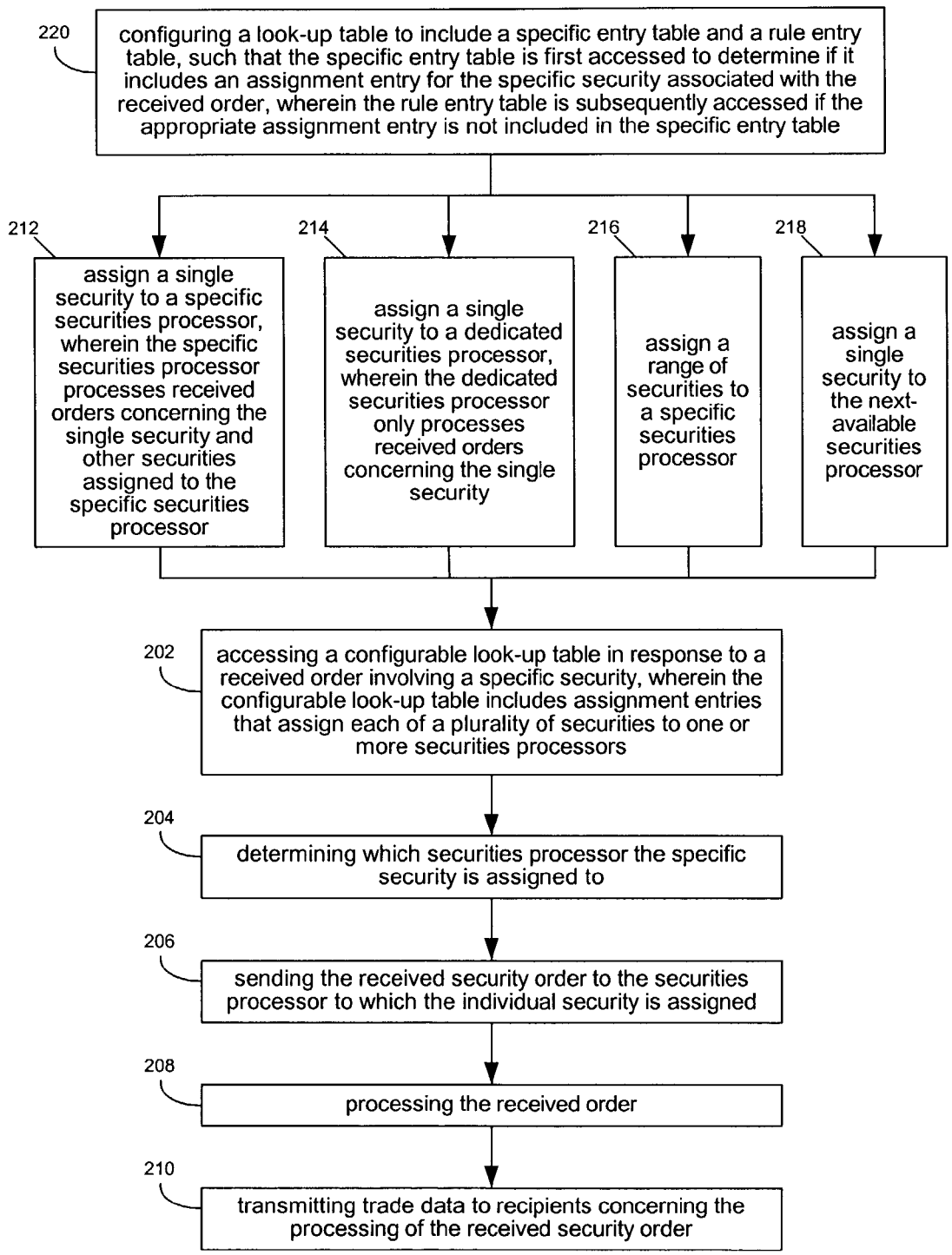
FIG. 5 is a block diagram of an order routing method.

Referring to FIG. 5, a process 200 of routing securities orders in an electronic market includes accessing 202 a configurable look-up table in response to a received order involving a specific security. The configurable look-up table includes assignment entries that assign each of a plurality of securities to one or more securities processors. A determination 204 is made concerning the securities processor that the specific security is assigned to. The received security order is sent 206 to the securities processor to which the specific security is assigned.

The received order is processed 208 and trade data concerning the processing of the received security order is transmitted 210 to recipients. This trade data includes a share volume and a share price.

The assignment entries include security-specific entries that assign 212 a single security to a specific securities processor, such that the specific securities processor processes received orders concerning the single security and other securities assigned to the specific securities processor. The assignment entries include dedicated entries that assign 214 a single security to a dedicated securities processor, such that the dedicated securities processor only processes received orders concerning the single security. The assignment entries include id-range entries that assign 216 a range of securities to a specific securities processor. The assignment entries include floating entries that assign 218 a single security to the next-available securities processor.

The configurable look-up table includes a specific entry table and a rule entry table. The specific entry table is first accessed 220 to determine if it includes an assignment entry for the specific security associated with the received order. If it doesn't, the rule entry table is subsequently accessed 222.

The specific entry table includes the security-specific entries and the dedicated entries, and the rule entry table includes the id-range entries and the floating entries.

Figure 6:
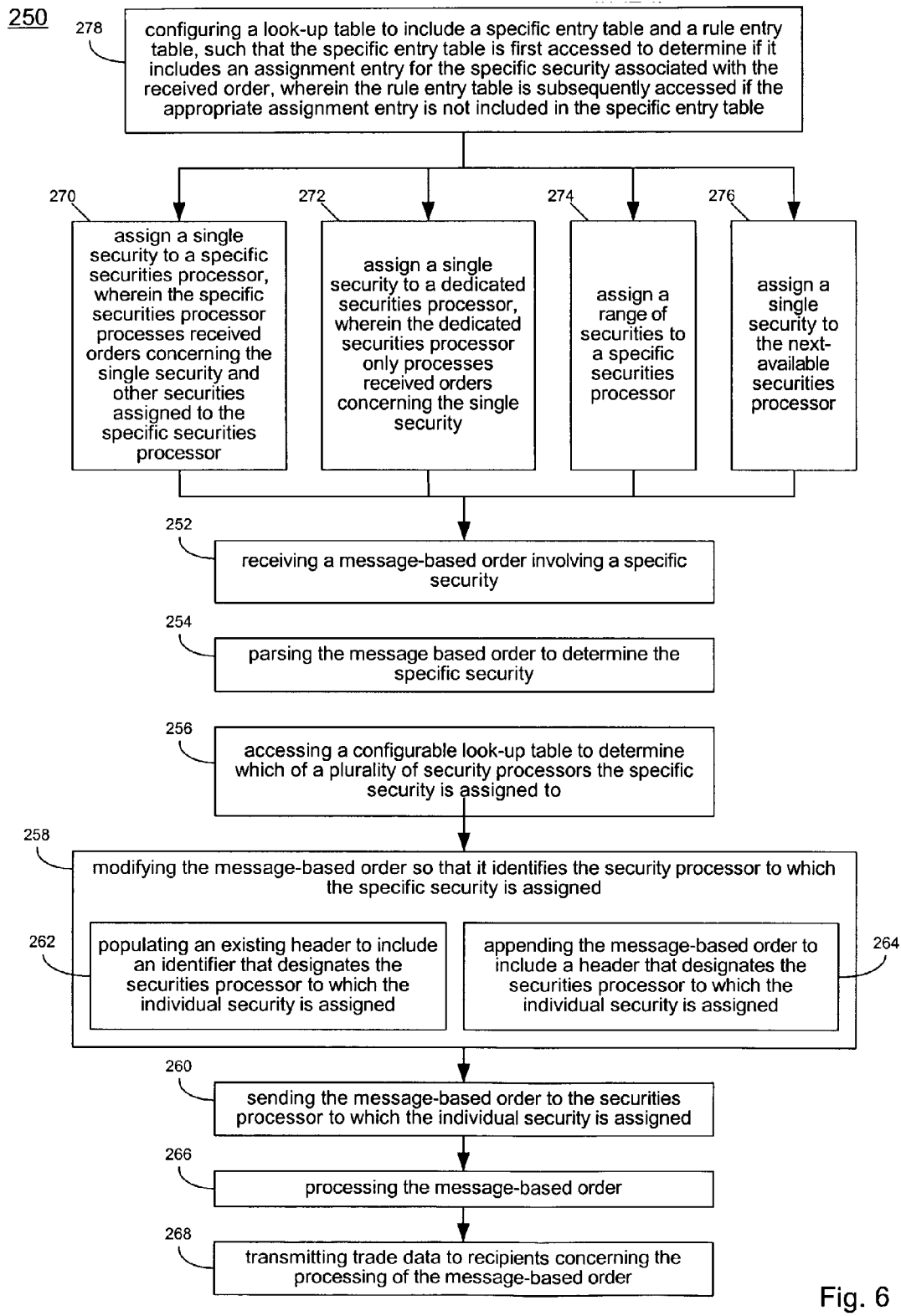
FIG. 6 is a block diagram of a securities order processing method.

Referring to FIG. 6, a process 250 of processing a securities order in an electronic market includes receiving 252 a message-based order involving a specific security. This message-based order is parsed 254 to determine the specific security it concerns. A configurable look-up table is accessed 256 to determine which of a plurality of security processors the specific security is assigned to. The message-based order is modified 258 so that it identifies the security processor to which the specific security is assigned.

The message-based order is sent 260 to the securities processor to which the individual security is assigned. Modifying the message-based order includes populating 262 an existing header to include an identifier that designates the securities processor to which the individual security is assigned. Modifying the message-based order includes appending 264 the message-based order to include a header that designates the securities processor to which the individual security is assigned.

The message-based order is then processed 266 and trade data concerning the processing of the message-based order is transmitted 268 to recipients. The configurable look-up table includes assignment entries that assign each of a plurality of securities to one or more securities processors.

The assignment entries include security-specific entries that assign 270 a single security to a specific securities processor, such that the specific securities processor processes received orders concerning the single security and other securities assigned to the specific securities processor. The assignment entries include dedicated entries that assign 272 a single security to a dedicated securities processor, such that the dedicated securities processor only processes received orders concerning the single security. The assignment entries include id-range entries that assign 274 a range of securities to a specific securities processor. The assignment entries include floating entries that assign 276 a single security to the next-available securities processor.

The configurable look-up table includes a specific entry table and a rule entry table. The configurable look-up table is configured 278 to first access the specific entry table to determine if the specific entry table includes an assignment entry for the specific security associated with the received order, such that the rule entry table is subsequently accessed if the appropriate assignment entry is not included in the specific entry table.

A number of embodiments of the invention have been described. Nevertheless, it will be understood that various modifications may be made without departing from the spirit and scope of the invention.

What is claimed is:

1. A system in an electronic securities market, the system comprising:
   a computer system comprising:
      a memory storing a configurable look-up table that includes
      a specific entry table including one or more security-specific entries assigning a single security to a securities processor, and
      a rule entry table including one or more id-range entries that assign a range of securities to a specific securities processor; and
      a processor for executing a configuration process for allowing administration of the assignment entries included in the configurable look-up table.

2. The system of claim 1 wherein the configurable look-up table is a text-based file and the configuration process is a text-based file editor.

3. The system of claim 1 wherein the configurable look-up table is a database file and the configuration process is a database configuration utility.

4. The system of claim 1 further comprising a security look-up process for accessing the configurable look-up table in response to a received order involving a specific security to determine which securities processor the specific security is assigned to.

5. The system of claim 4 further comprising a messaging process, responsive to the security look-up process, for sending the received security order to the securities processor to which the specific security is assigned.

6. The system of claim 1 wherein the id-range entries in the rule entry table are ticker symbols.

7. The system of claim 1 wherein the specific entry table includes an entry that assigns a single security to a specific securities processor.

8. The system of claim 1 wherein the specific entry table includes one or more dedicated entries that assign a single security to a dedicated securities processor, wherein the dedicated securities processor only processes received orders concerning the single security.

9. The system of claim 1 wherein the rule entry table that includes the one or more id-range entries that assign a range of securities to a specific securities processor includes at least one wild card symbol in character positions of the id, to identify any combination of characters in the character positions of the id having the wildcard symbol as corresponding to that entry.

10. The system of claim 1 wherein the rule entry table includes one or more floating entries that assign a single security to the next-available securities processor.

11. The system of claim 1 wherein the configurable look-up table is configured so that the specific entry table is first accessed to determine if it includes an assignment entry for the specific security associated with the received order, and the rule entry table is subsequently accessed if the appropriate assignment entry is not included in the specific entry table.

12. A computer readable storage device storing a configurable look-up table for use by an application program in management of securities trading to route incoming orders to an electronic market to one or more securities processors, the configurable look-up table comprising:
   a specific entry table including one or more security-specific entries that cause the application program to assign a single security to a securities processor; and
   a rule entry table including entries that cause the application program to assign securities to processors based on at least one of id-range assignment entries and floating assignment entries.

13. The device of claim 12 wherein the specific entry table assigns the single security to a specific securities processor.

14. The device of claim 12 wherein the specific entry table assigns the single security to a dedicated securities processor, wherein the dedicated securities processor only processes received orders concerning the single security.

15. The device of claim 12 wherein the id-range entries assign a range of securities to a specific securities processor.

16. The device of claim 12 wherein the rule entry table includes one or more floating entries that assign a single security to the next-available securities processor.

17. The device of claim 12 wherein the configurable look-up table is configured so that the specific entry table is first accessed to determine if it includes an assignment entry for the specific security associated with the received order, and the rule entry table is subsequently accessed if the appropriate assignment entry is not included in the specific entry table.

18. The device of claim 12 wherein id-range entries in the configurable look-up table include at least one wild card symbol in character positions of the id, to identify any combination of characters in the character positions of the id having the wildcard symbol as corresponding to that entry.

* * * * *